United States Patent [19]

Broer et al.

[11] Patent Number: 4,606,017

[45] Date of Patent: Aug. 12, 1986

[54] OPTICAL RECORDING DISC

[75] Inventors: Dirk J. Broer; Leendert Vriens, both of Eindhoven, Netherlands

[73] Assignee: U.S. Philips Corporation, New York, N.Y.

[21] Appl. No.: 503,987

[22] Filed: Jun. 13, 1983

[30] Foreign Application Priority Data

Mar. 17, 1983 [NL] Netherlands .......................... 8300960

[51] Int. Cl.⁴ ................................................ G11B 7/24
[52] U.S. Cl. ..................................... 369/275; 369/286; 369/288; 346/135.1
[58] Field of Search ................. 369/275, 111, 94, 283, 369/284, 286, 288; 346/76 L, 137, 135.1

[56] References Cited

U.S. PATENT DOCUMENTS

| | | | |
|---|---|---|---|
| 4,389,719 | 6/1983 | Donk | 369/275 |
| 4,451,915 | 5/1984 | La Budde | 369/275 |
| 4,476,214 | 10/1984 | Zalm | 346/135.1 |
| 4,477,328 | 10/1984 | Broeksens | 369/275 |

FOREIGN PATENT DOCUMENTS 109138  7/1982  Japan ................................... 369/275

Primary Examiner—Alan Faber
Attorney, Agent, or Firm—Norman N. Spain

[57] ABSTRACT

Optical recording disc having successively a transparent substrate plate, a first layer of a formstable synthetic resin comprising an optically readable information track, a second thin layer of a linearly polymerized amorphous synthetic resin and a recording layer in which optically readable information bits are formed by exposure to modulated laser light.

4 Claims, 1 Drawing Figure

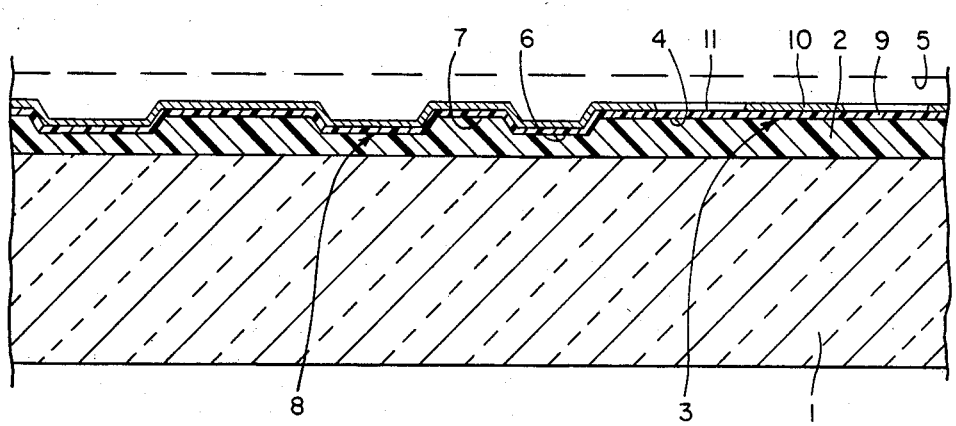

OPTICAL RECORDING DISC

The invention relates to an optical recording disc comprising a transparent substrate plate on which at least one side there is a layer of a transparent dimensionally stable synthetic resin in which an optically readable information track is provided and which on the side of the layer of formstable synthetic resin comprises a recording layer in which optically readable information bits are formed by exposure to modulated laser light.

Such an optical recording disc is known, for example, from Netherlands Patent Application No. 8005693 (PHN 9861) which corresponds to U.S. Pat. No. 4,476,214, in the name of applicants. According to FIG. 1 of this Netherlands patent application the substrate plate is a glass disc which on one side has a light-cured lacquer layer of acrylic acid esters in which the information track is provided. The lacquer layer has a recording layer of a Te-Se-Sb alloy in which holes (information bits) are formed upon exposure to pulsated laser light.

Applicants have found that the light-cured lacquer layer of acrylic acid esters is sufficiently dimensionally stable so that the shape or the geometry of the information track which is essential for the ready operation of the information disc, is maintained in operational conditions.

Applicants have found that a good dimensional stability of the synthetic resin in which the information track is provided is achieved when the synthetic resin satisfies two requirements. The first requirement is that the synthetic resin must have a softening temperature which exceeds 120° C. The second requirement is that the synthetic resin has a water-absorption of at most 0.2% by weight.

Applicants have furthermore found that when such a dimensionally stable synthetic resin is used the said advantage as regards the quality of the information track is obtained, it is true, but the disadvantage also presents itself that the sensitivity of the recording layer to laser light is reduced.

On the basis of the knowledge gained by applicants of the physical processes which take place when an information bit is formed in the recording layer under the influence of pulsated laser light, it has been endeavoured to modify the formstable synthetic resin in such manner that the disadvantage of a reduced laser light sensitivity of the recording layer is removed at least partly. It has been tried, for example, to improve the sensitivity of the recording layer by incorporating in the underlying dimensionally stable synthetic resin which has an important influence on the said sensitivity, substances which reduce the surface pressure of the synthetic resin or substances which, under the influence of laser light, show an exothermal reaction or low-molecular substances which produce a pressure build-up in the synthetic resin upon exposure to laser light. Although in many cases an increase of the sensitivity is obtained, the quality of the layer of synthetic resin deteriorates, for example, in that the formstability decreases, the moisture stability decreases, the bonding of the recording layer to the synthetic resin is reduced or the recording layer is deteriorated under the influence of the synthetic resin layer.

It is the object of the present invention to provide an optical recording disc which comprises a dimensionally stable layer of synthetic resin in which the information track is provided and which does not exhibit the above-mentioned disadvantages.

According to the invention this object is achieved by means of an optical recording disc of the type mentioned in the opening paragraph which is characterized in that a second, thin layer of synthetic resin of a linearly polymerized, amorphous synthetic resin is provided between the layer of transparent dimensionally stable synthetic resin and the recording layer, the second, thin layer following the contours of the information track and reducing the energy which is minimally required to form an information bit in the recording layer by means of the laser light.

Hence the invention is based on the principle of separating the desired functions or properties of the synthetic resin, namely a good form stability and a positive influence on the laser light sensitivity of the recording layer and to accommodating these functions in separate synthetic resin layers. One layer of synthetic resin ensures the said dimensional stability and the other layer of synthetic resin ensures an optimum laser light sensitivity. As already stated above, the laser light sensitivity is defined as the energy which is minimally required to form an information bit in the recording layer by means of laser light. This minimum energy is termed the threshold energy.

The thickness of the second layer of synthetic resin is chosen such that the layer follows the contours of the information track. The information track may be in the form of a groove which is optically readable and can be followed by the laser light beam. The depth of the groove is $\lambda/8n$, where $\lambda$ is the wavelength of the laser light and n is the refractive index of the substrate plate. Such a track is called a guide track. The groove may be locally recessed, in which the recessed portions together with the intermediate non-recessed bottom portions of the groove constitute an optically readable structure of information areas situated alternately at a higher level and at a lower level. The part of the groove having the optically readable structure is called the heading. The depth of the heading is $\lambda/4n$, where $\lambda$ and n have the above-given meanings. The second layer of synthetic resin follows the shape of the groove and of the heading so that the recording layer provided on the second layer of synthetic resin also follows the groove structure and heading structure. The verb "to follow" is to be understood to mean herein that the surface of the second layer of synthetic resin remote from the groove or heading has the same profile as the groove or heading albeit on a slightly reduced scale due to the fact that the second layer of synthetic resin has a given thickness. The same applies to the recording layer. The groove is usually spiral-like but may in principle also consist of concentric circles. The width of the groove is not restricted to narrow limits. An example of a suitable width is 600 nm. The depth of the groove is not restricted to narrow limits either and may vary from, for example, 20 to 200 nm. A suitable depth is 60 nm. The heading usually has the same width as the groove and a depth which is double the groove.

The thickness of the second layer of synthetic resin preferably is at most 300 nm. In a favourable embodiment of the recording disc according to the invention the thickness of the second layer of synthetic resin is at most 200 nm.

The groove and the heading are read by means of weak laser light which is focussed on the groove preferably via the transparent substrate. The laser light is partly reflected by the recording layer. The reading laser light has such a low intensity that no information bits are formed in the recording layer. The laser light follows the groove on the basis of phase different between the forward and the reflected laser light beams. These differences at the area of the groove have a value difference from that at the area of the higher portions of the recording layer present beside the groove. The heading is read by means of weak laser light on the basis of phase differences. The information stored in the heading comprises, for example, data as regards the location of recording. Upon recording, the recording layer is exposed to laser light which is modulated in accordance with the data to be recorded. The laser light has a comparatively high intensity which, by way of example, is a factor 10 higher than that of the reading of scanning laser light. Information bits are formed in the exposed places. A suitable recording layer is a layer of a chalcogenide, for example, a tellurium alloy. As a result of a local melting process, holes or cavities having a thickened edge portion are formed in the exposed places. The same type of information bits, for example holes or cavities, can be obtained when a dye layer or a dye-containing layer of synthetic resin is used. Decolouring and/or decomposition may take place in the exposed areas of the dye layer, dependant from the type of dye.

The recording of information preferably takes place in those parts of the groove which do not comprise the heading. The information bits, for example, cavities or holes, can be traced and read by means of weak laser light because at the area of a bit the optical properties of the recording layer, for example the reflection power, transmission and the like are changed. Both upon recording information and upon reading the information bits, a laser light beam is preferably used which is focused on the recording layer via the transparent substrate. As a result it is achieved that the contaminations present on the surface of the substrate, for example, scratches and dust particles, fall beyond the depth of focus of the objective with which the light is focused. These contaminations then have no negative influence on the quality of the recorded data.

The second thin layer of synthetic resin preferably comprises an amorphous, linearly polymerised synthetic resin having a molecular weight of at most $10^6$. Upon the exposure to laser light the synthetic resin should not decompose exothermally because the decomposition products reduce the quality of the recording disc and have an unfavourable influence on the recording of information and the reading thereof. Very suitable synthetic resins are amorphous, linearly polymerised acrylate-, methacrylate- or styrene synthertic resins. Examples of such resins are polymethylmethacrylate, polythylmethacrylate, polymethylacrylate, polyethylacrylate, poly-2-ethylhexylacrylate and polystyrene. The synthetic resins are preferably provided by means of a so-called spin-coating process. According to this process the synthetic resin is dissolved in a suitable organic solvent. The solution is deposited on the surface of the disc to be coated which is then rotated. The synthetic resin solution spreads over the whole surface and flows partly over the edge of the disc. The solvent evaporates and a solid layer of synthetic resin is obtained. The thickness of the layer of synthetic resin is small and depends inter alia on the speed of rotation and the viscosity of the solution.

The transparent formstable synthetic resin in which the information track is provided is, for example, a cross-linked acrylate synthetic resin, a polycarbonate, a polyethyleneterephthalate, a polyimide or a polysulfone. A cross-linked acrylate synthetic resin is manufactured by cross-linking an acrylate monomer comprising at least two unsaturated bonds, for example a diacrylate, triacrylate or tetracrylate, or mixtures thereof or mixtures with other monomers, for example, a monoacrylate or N-vinylpyrrolidone under the influence of light or heat. A high cross-link density stimulates the dimensional stability. The cross-link density increases with a higher content of unsaturated (—C═C—) bonds. The cross-linkable monomer composition must naturally comprise a catalyst or a photo-initiator, for example a benzoin-isobutylether. A good formstable acrylate synthetic resin is cross-linked hexanedioldiacrylate.

The substrate plate may comprise a separate layer of a transparent dimensionally stable synthetic resin. It is also possible for the whole substrate place to be manufactured from a transparent formstable synthetic resin, for example of polycarbonate.

In a preferred form of the optical recording disc according to the invention a substrate plate of glass is used which on one side has a layer of a cross-linked acrylate synthetic resin in which an optically readable information track is provided, which layer is provided successively with a thin layer of a linearly polymerised acrylate-, methacrylate- or styrene synthetic resin and a recording layer.

The invention will now be described in greater detail with reference to the example and the drawing, the sole FIGURE of which is a tangential sectional view of a recording disc according to the invention.

EXAMPLE

A glass plate 1 comprises on one side a layer 2 of a formstable synthetic resin obtained by exposing a layer of a liquid monomer composition comprising 96% by weight of hexanediolacrylate and 4% by weight of benzildimethylketal (photo-initiator) to ultraviolet light for 1 minute. The resulting dimensionally stable synthetic resin is a cross-linked acrylate synthetic resin. The layer 2 comprises an information track 3 having a groove 4. The surface of the layer of synthetic resin 2 outside the groove 4 is denoted by a broken line 5. The groove comprises recessed portions 6 which together with the intermediate groove portions 7 form an optically readable information structure 8. The layer 2 of synthetic resin is coated with a layer 9 of an amorphous linearly polymerised synthetic resin, in this case polymethylmethacrylate. The layer thickness is smaller than 200 nm. A recording layer 10 of TeSeSbS is provided on the layer 9 in a thickness of 30 nm. By exposure to pulsated laser light a cavity 11 (information bit) is formed. The threshold energy which is the quantity of laser light energy minimally required to form an information bit 11 is 0.53 nJ per pulse.

The same test has been carried out with a second recording disc which differs from the disc shown in the FIGURE in that no synthetic resin layer 9 of an amorphous linearly polymerized synthetic resin is present. The threshold energy required to form an information bit in the recording layer 10 then is 0.78 nJ per pulse. By using the layer 9 of synthetic resin an increase of the sensitivity (reduction of the threshold energy) of the recording layer of 34% is hence obtained.

In the table below the results are recorded of experiments carried out with recording discs of the type shown in the FIGURE in which always a different layer 9 of the amorphous linearly polymerised synthetic resin is used. In each experiment the threshold energy was determined and compared with that of a recording disc in which no synthetic resin layer 9 is present. The increase of the laser light sensitivity (reduction of the threshold energy) of the recording layer, expressed in percent, is recorded in column 4 of the table. In column 1 the type of amorphous linearly polymerised synthetic resin is given. The average molecular weight of said synthetic resin is recited in column 2. The thickness of the layer of synthetic resin is recited in column 3.

TABLE

| synthetic resin | $\overline{M}$ | layer thickness | increase in sensitivity |
| --- | --- | --- | --- |
| polymethylmethacrylate | $61 \times 10^3$ | 200 nm[1] | 32 |
| polymethylmethacrylate | $21 \times 10^5$ | 200 nm | 26 |
| polyethylmethacrylate | $39.5 \times 10^4$ | 200 nm | 23 |
| polymethylacrylate | $20 \times 10^4$ | 200 nm | 18 |
| polyethylacrylate | $12.5 \times 10^4$ | 200 nm | 32 |
| poly-2-ethylhexylacrylate | $12.4 \times 10^4$ | 200 nm | 23 |
| polystyrene | $4 \times 10^3$ | 100 nm[2] | 24 |
| polystyrene | $35 \times 10^3$ | 180 nm | 22 |
| polystyrene | $80 \times 10^3$ | 340 nm | 27 |

[1] the acrylate or methacrylate layers are spun from a 5% by weight solution in toluene 2-methoxyethylacetate (1:1) at a speed of 500 rpm. The resulting synthetic resin film has a thickness of 50-200 nm.
[2] the polystyrene layers are spun (spin-coating process) from 1 5% by weight solution in ethylbenzene at a speed of 5,000 rpm.

What is claimed is:

1. An optical recording disc comprising a transparent substrate plate which on at least one side comprises a layer of a transparent formstable synthetic resin in which an optically readable information track is provided and which on the side of the layer of dimensionally stable synthetic resin comprises a recording layer in which recording layer optically readable information bits are formed by exposure to modulated laser light, characterized in that a thin synthetic resin layer of a linearly polymerized amorphous synthetic resin is provided between the layer of transparent formstable synthetic resin and the recording layer, the thin layer following the contours of the information track and reducing the energy which is minimally required to form an information bit in the recording layer by means of the laser light.

2. An optical recording disc as claimed in claim 1, characterized in that the thin layer of synthetic resin has a thickness of at most 200 nm.

3. An optical recording disc as claimed in claim 1 characterized in that the thin layer of synthetic resin is manufactured from a linearly polymerised acrylate-, methacrylate- or styrene synthetic resin.

4. An optical recording disc as claimed in claim 1 having a substrate plate of glass which on one side comprises a layer of a crosslinked acrylate synthetic resin in which an optically readable information track is provided, which layer is provided successively with a thin layer of a linearly polymerised acrylate-, methacrylate or styrene synthetic resin and a recording layer.

* * * * *

UNITED STATES PATENT AND TRADEMARK OFFICE
CERTIFICATE OF CORRECTION

PATENT NO. : 4,606,017
DATED : August 12, 1986
INVENTOR(S) : DIRK J. BROER ET AL It is certified that error appears in the above-identified patent and that said Letters Patent is hereby corrected as shown below:

IN THE CLAIMS:

Claim 1, column 6, line 11, change "formstable" to

--dimensionally stable--.

Signed and Sealed this

Seventeenth Day of February, 1987

*Attest:*

DONALD J. QUIGG

*Attesting Officer*  *Commissioner of Patents and Trademarks*